United States Patent [19]

Inokuchi

[11] Patent Number: 5,383,223
[45] Date of Patent: Jan. 17, 1995

[54] POWER CONTROL DEVICE WHEREIN A BIAS VOLTAGE IN LEVEL DETECTION IS GIVEN A CONSTANT DIFFERENCE FROM A DETECTED VOLTAGE

[75] Inventor: Hiroyuki Inokuchi, Mitaka, Japan

[73] Assignee: Japan Radio Co., Ltd., Tokyo, Japan

[21] Appl. No.: 72,473

[22] Filed: Jun. 4, 1993

[30] Foreign Application Priority Data

Jun. 5, 1992 [JP] Japan .................... 4-145301

[51] Int. Cl.⁶ .................... H03G 3/30; H04B 1/02
[52] U.S. Cl. .................... 375/60; 455/115; 455/126; 455/127; 330/279
[58] Field of Search .................... 375/5, 60, 76, 98; 455/115, 117, 126–127, 251.1; 330/278–279, 284–285, 291

[56] References Cited

U.S. PATENT DOCUMENTS

| | | | |
|---|---|---|---|
| 4,553,104 | 11/1985 | Olsen .................... | 330/279 |
| 4,602,218 | 7/1986 | Vilmur et al. .................... | 330/279 |
| 5,081,713 | 1/1992 | Miyazaki .................... | 455/126 |
| 5,101,176 | 3/1992 | Norimatsu .................... | 455/126 |
| 5,113,525 | 5/1992 | Andor .................... | 455/127 |
| 5,196,806 | 3/1993 | Ichihara .................... | 455/126 |
| 5,287,555 | 2/1994 | Wilson et al. .................... | 455/126 |

FOREIGN PATENT DOCUMENTS

| | | | |
|---|---|---|---|
| 0347141A3 | 12/1989 | European Pat. Off. ....... | H03G 3/20 |
| 0446073A1 | 9/1991 | European Pat. Off. ....... | H03G 3/20 |
| 0472330A3 | 2/1992 | European Pat. Off. ....... | H03G 3/20 |
| 0481524A3 | 4/1992 | European Pat. Off. ....... | H03G 3/20 |
| 4-157927 | 5/1992 | Japan .................... | H04B 1/04 |
| 5-343938 | 12/1993 | Japan .................... | H03G 3/12 |
| 2238435A | 5/1991 | United Kingdom .......... | H03G 3/00 |

OTHER PUBLICATIONS

Patent Abstracts of Japan, vol. 16, No. 447 (E-1266) Sep. 17, 1992 & JP-A-41 57 927 (NEC Corp.).

Primary Examiner—Stephen Chin
Assistant Examiner—Young Tse
Attorney, Agent, or Firm—Frishauf, Holtz, Goodman & Woodward

[57] ABSTRACT

In a level detector (17), a bias voltage is developed by a bias current to have a substantially constant difference irrespective of a temperature variation from a detected voltage produced by detecting a device output signal for use in TDM modulation. A control signal generator (19) calculates a substantially temperature independent difference digital value by subtracting a second digital value of the bias voltage from a first digital value of the detected voltage to produce an attenuation control analog level used in controlling a variable attenuator (11) which deals with a device input signal to produce an attenuator output signal with a desired value for use as the device output signal. Preferably, the detected and the bias voltages are amplified by a variable gain amplifier (35) controlled by a processor output signal.

10 Claims, 3 Drawing Sheets

POWER CONTROL DEVICE WHEREIN A BIAS VOLTAGE IN LEVEL DETECTION IS GIVEN A CONSTANT DIFFERENCE FROM A DETECTED VOLTAGE

BACKGROUND OF THE INVENTION

This invention relates to a level or power control device for use in digital modulation accompanying an amplitude variation, such as in $\pi/4$ quadrature phase shift keying (QPSK) modulation.

Various level control devices are already known for use more in general. Examples are described in Japanese Patent Prepublication (Kôkai) No. 157,927 of 1992. According to this prepublication, an intermediate frequency (IF) signal is preliminarily mixed with a local signal into a radio frequency (RF) signal for supply to a prior-art level control device. In an improved level control device revealed in the prepublication, an IF signal is supplied directly to the level control device. The improved level control device produces an RF signal with a controlled level.

Meanwhile, conversion of analog communication to digital communication is in rapid progress recently. Digital modulation with an amplitude variation is widely applied to communication networks. For example, $\pi/4$ QPSK modulation and demodulation is becoming into practical use in a mobile telephone and/or other communication network.

In general, a level control device is supplied with a device input signal and produces a device output signal having a controlled or predetermined output level. For use in digital modulation accompanying an amplitude variation, a novel level or power control device is invented by the present inventor and disclosed in a patent application which is filed in Japan under Patent Application No. 4-145,302 of 1992 and which was published under Japanese Published Unexamined Application No. 5-343938. Although this patent application was filed on the same date as a basic patent application used in filing the instant patent application abroad, the novel level control device will be used as showing the state of art on describing the present invention.

In the manner which will later be described in greater detail, the novel level control device comprises a variable attenuator responsive to the device input signal for producing an attenuator output signal having an attenuated level, and a level detecting unit for detecting the attenuator output signal to produce a detected signal having a detected voltage related to the attenuated level. Supplied with the detected signal as a generator input signal and comparing a digital value of the detected voltage with a reference value, a control signal generator generates an attenuation control signal having an attenuation control level.

More in detail, the control signal generator comprises an A/D converter for converting the detected voltage to the digital value. Comparing the digital value with the reference value, a processor produces a digital control signal having a digital control value. Converting the digital control value to an analog value, a D/A converter produces the attenuation control signal with the analog value used as the attenuation control level.

Controlled by the attenuation control signal, the variable attenuator enables use of the attenuator output signal as the device output signal. The reference value is readily determined by the controlled output level. It is possible to use whichever of the IF and the RF signals as the device input signal.

When used in time division multiplex (TDM) modulation, the novel level control device is very effectively operable. It is known that the TDM modulation is desirable in effectively using channels.

The novel level control device, however, has a few defects when such a level control device should be reliably operable, namely, be operable stably and precisely or correctly. More particularly, operation of the novel level control device decomes unstable and incorrect when the controlled output level is low, typically, when the controlled output level is not higher than plus 10 dBm.

One of the defects is such that the level control is unstable against a variation in the ambient temperature. The level detecting unit includes a detector diode for detecting the controlled output level which is derived from the attenuated level. When the controlled output level is low, the detector diode has a high internal resistance and becomes excessively sensitive to the temperature variation.

In such a level detecting unit, the detector diode is usually supplied with a constant bias current with a bias voltage. When the controlled output level is low, the detected voltage is subjected to an objectionably wide variation by a slight variation in the contolled output level.

Another defect is an appreciable influence caused to the attenuation control level by conversion errors inevitable in operation of the A/D and the D/A converters. When the controlled output level is low, the conversion errors are not negligible as compared with a little variation in the detected voltage.

The variable attenuator usually comprises attenuator diodes and has an attenuation characteristic which is nonlinear relative to the attenuation control level. When the controlled output level should be low, the variable attenuator must give a great amount of attenuation to the device input signal. For this purpose, the attenuation control level must be given a small value. Consequently, it again results that the conversion errors are not negligible when compared with this small value of the attenuation control level.

SUMMARY OF THE INVENTION

It is consequently a principal object of the present invention to provide a level control device which is for use in TDM modulation and is stably and precisely operable.

It is another principal object of this invention to provide a level control device which is of the type described and which is stable against a variation in temperature.

It is a subordinate object of this invention to provide a level control device which is of the type described and which is operable so as not be appreciably adversely affected by a conversion error between analog and digital values.

Other objects of this invention will become clear as the description proceeds.

On setting forth the gist of an aspect of this invention, it is possible to understand that a level control device produces for use in time division multiplex modulation a device output signal in response to a device input signal with the device output signal given a controlled output level and comprises: (a) a variable attenuator responsive to the device input signal for producing an attenuator output signal having an attenuated level, (b) a bias current generator for generating a bias current, (c) level detecting means controlled by the bias current for detecting the attenuator output signal to produce a detected signal, to develop a bias voltage, and to give the detected signal alternatingly a detected voltage related to the attenuated level and the bias voltage, (d) a control signal generator responsive to a generator input signal and a reference value for generating an attenuation control signal having an attenuation control level, and (e) attenuation control signal supply means for supplying the attenuation control signal to the variable attenuator to enable use of the attenuator output signal as the device output signal.

In accordance with the aspect being described, the above-understood level control device is characterised as follows. (A) The bias current generator generates the bias current to give the bias voltage a substantially temperature independent difference from the detected voltage irrespective of a temperature variation. (B) The control signal generator uses the detected signal as the generator input signal to convert the detected voltage and the bias voltage collectively to a substantially temperature independent digital value and compares the digital value with the reference value to derive an analog value for use as the attenuation control level.

On setting forth the gist of a different aspect of this invention, it is possible to understand that a level control device produces for use in time division multiplex modulation a device output signal in response to a device input signal with the device output signal given a controlled output level and comprises: (a) a variable attenuator responsive to the device input signal for producing an attenuator output signal having an attenuated level, (b) a bias current generator for generating a bias current, (c) level detecting means controlled by the bias current for detecting the attenuator output signal to produce a detected signal, to develop a developed bias voltage, and to give the detected signal alternatingly a detected voltage and the bias voltage, (d) a control signal generator responsive to a generator input signal and a reference value for generating an attenuation control signal having an attenuation control level, and (e) attenuation control signal supply means for supplying the attenuation control signal to the variable attenuator to enable use of the attenuator output signal as the device output signal.

In accordance with the different aspect of this invention, the above-understood level control device is characterised as follows. The level control device further comprises: (A) a gain variable amplifier for amplifying the detected signal with a variable gain into an amplifier output signal to give the amplifier output signal alternatingly an amplified voltage related to the detected voltage and an amplified bias voltage related to the developed bias voltage, and (B) a gain controller responsive to a device control signal for controlling the variable gain. (C) The bias current generator generates the bias current to give the developed bias voltage a substantially constant difference from the detected voltage irrespective of a temperature variation. (D) The control signal generator uses the amplifier output signal as the generator input signal to convert the amplified voltage and the amplified bias voltage collectively to a substantially temperature independent digital value and compares the digital value with the reference value to derive a digital control value, to produce a processor output signal having a digital processor output value proportional to the digital control value, and to convert the digital control value to an analog signal for use as the attenuation control signal, the control signal generator thereby supplying the processor output signal to the gain controller as the device control signal.

DESCRIPTION OF THE PREFERRED EMBODIMENT

Figure 1:
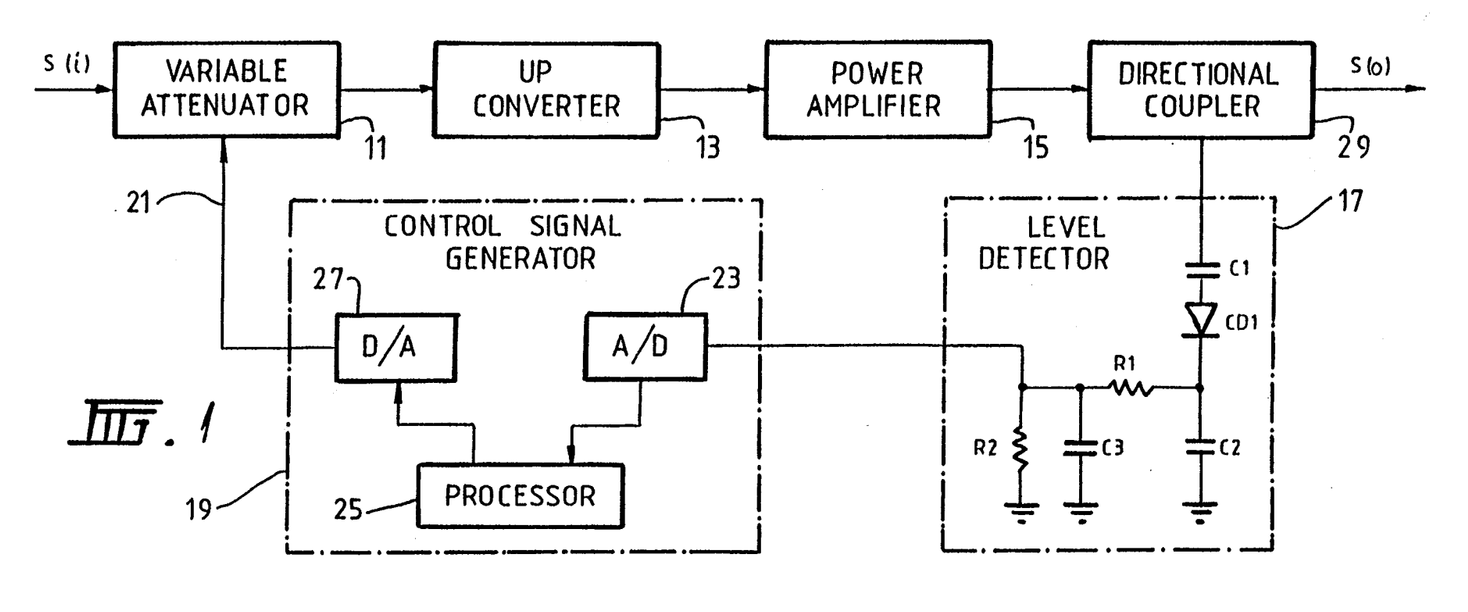
FIG. 1 is a block diagram of a level control device known by the present inventor.

Referring to FIG. 1, attention will be directed first to a level or power control device which is described heretobefore as a novel level control device. This is in order to facilitate an understanding of the present invention. It will be surmised that the level control device is for use in a time division multiplex (TDM) modulation system. TDM modulation is digital modulation with an amplitude variation and is typically $\pi/4$ quadrature phase shift keying (QPSK) modulation with TDM.

In FIG. 1, the level control device is supplied with a device input signal S(i) for use in the TDM modulation system and produces a device output signal S(o) which is a radio frequency (RF) signal having a controlled or predetermined output power or level. It is possible to use whichever of an intermediate frequency (IF) signal and an RF signal as the device input signal. Merely for convenience of the description, it will be presumed throughout the following that the device input signal is an IF signal unless it is specifically mentioned that the device input signal is an RF signal.

Supplied with the device input signal, a variable attenuator 11 produces an attenuator output signal having an attenuated level. An up converter 13 comprises a local oscillator (not shown) for generating a local signal and a mixer (not shown) for mixing the attenuator output signal with the local signal into an RF intermediary signal. A power amplifier 15 amplifies the RF intermediary signal into an amplified signal of an amplified level. Inasmuch as the amplified signal is produced in this manner, the amplified level is related to the attenuated level.

The amplified signal is coupled to a level detector 17 in the manner which will presently be described. The level detector 17 detects the amplified signal and produces a detected signal having a detected voltage related to the amplified level and consequently to the attenuated level.

More particularly, the level detector 17 comprises a first capacitor C1 supplied with the amplified signal. A detector or first diode CD1 and a second capacitor C2 are connected in series between the first capacitor and ground to serve as a rectifier for producing a half-wave rectified signal. A point of connection between the detector diode and the second capacitor is grounded through a series connection of a first resistor R1 and a third capacitor C3. The series connection serves as a smoothing circuit for depriving the amplitude variation from the half-wave rectified signal. The detected signal is produced at a point of connection between a second resistor R2 and a point of connection of the first resistor and the third capacitor.

It is now understood that a combination of the up converter 13, the power amplifier 15, and the level detector 17 serves as a level detecting unit for detecting the attenuator output signal to produce the detected signal. If an RF signal is used as the device input signal, the level detecting unit need not include the up converter 13. In such an event, the level detecting unit amplifies the attenuator output signal directly into the amplified signal and then produces the detected signal.

In the manner which will become clear as the description proceeds, a generator input signal is supplied to a control signal generator 19 for generating an attenuation control signal having an attenuation control level. The generator input signal has a level or value which is herein called an input level. In the example being illustrated, the detected signal is used as the generator input signal. The detected voltage serves as the input level.

Serving as an attenuation control signal supply arrangement 21, a connection supplies the attenuation control signal to the variable attenuator 11 with an attenuation control level. Controlled in compliance with the attenuation control level, the variable attenuator 11 controls, in turn, the attenuated level. The amplified level and the detected voltage are accordingly controlled.

The control signal generator 19 comprises an A/D converter (A/D) 23 supplied with the generator input signal for converting the input level to a digital value. A reference value is preliminarily stored in a processor or central processor unit (CPU) 25 in consideration of the controlled or predetermined output level of the device output signal.

Connected to the A/D converter 23, the processor 25 compares the digital value with the reference value and produces a processed signal having a processed level or value which is variable relative to the reference value in accordance with the input level. Supplied with the processed signal, a D/A converter (D/A) 27 converts the processed level to an analog value to produce the attenuation control signal with the analog value used as the attenuation control level.

The amplified signal is produced as the device output signal through a directional coupler 29 which is connected to a transmitter (not shown) and to the first capacitor Cl of the level detector 17. With the amplified level controlled by the attenuation control signal, the device output signal is given the controlled output level. In this manner, the attenuator output signal is used as the device output signal.

Figure 2:
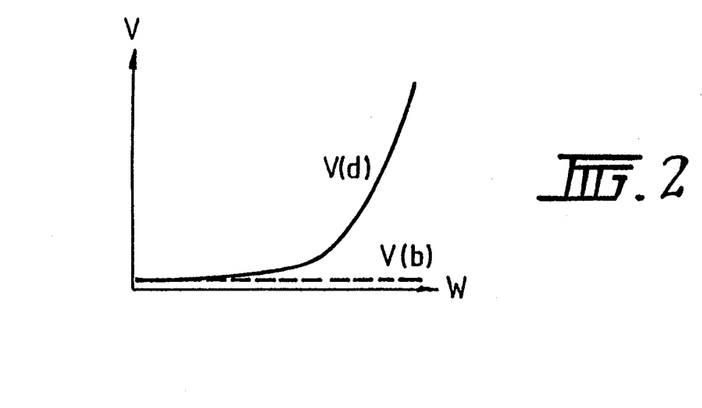
FIG. 2 schematically shows a characteristic of a level detector used in such a level control device.

Turning to FIG. 2 with FIG. 1 additionally referred to, voltage is depicted along the ordinate in V. The controlled output power or level is labelled W and is illustrated along the abscissa.

In the manner described hereinabove, the detector diode CDI of the level detector 17 has a high internal resistance when the attenuated level and therefore the controlled output level is low. As a consequence, the detected voltage varies with the controlled output level in the manner exemplified by a solid-line curve labelled V(d).

The internal resistance varies with temperature. The detected voltage consequently fluctuates in response to a temperature variation. When the controlled output level is low, for example, is not higher than plus 10 dBm, this fluctuation gives rise to an error in the attenuation control level. As a result, the controlled output level is given a temperature error which can not be neglected.

In FIG. 1, each of the A/D and D/A converters 23 and 27 has an inevitable conversion error. This gives the attenuation control level and therefore the controlled output level a converter error which can not be neglected when the controlled output level is low as exemplified above.

Figure 3:
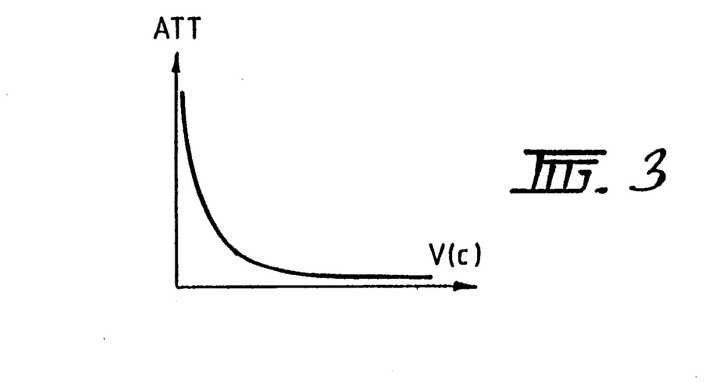
FIG. 3 is a schematic representation of a characteristic of a variable attenuator for use in a level control device of the type being illustrated.

Turning now to FIG. 3 with FIG. 1 continuously referred to, the attenuation control level is depicted along the abscissa as a control voltage V(c). In the variable attenuator 11, the attenuation control signal gives the device input signal an amount of attenuation ATT illustrated along the ordinate. The variable attenuator 11 has an attenuation characteristic exemplified by a curve on a linear scale.

More specifically, the amount of attenuation varies accompanying a nonlinearity relative to the attenuation control level and must be great when the controlled output level should be low. For this purpose, the attenuation control signal must have an accordingly low attenuation control level. The nonlinearity gives the controlled output level an uncertainty which can not be neglected when the controlled output level is low in the manner exemplified before. Moreover, the conversion error of the A/D or D/A converter 23 or 27 gives an appreciable converter error to the low attenuation control level.

Reviewing FIGS. 1 through 3, the illustrated level control device is excellently operable as described heretobefore. The level control device is, however, defective in view of an unstableness resulting in its operation from the temperature error and the converter error and of an incorrectness resulting from the uncertainty.

Figure 4:
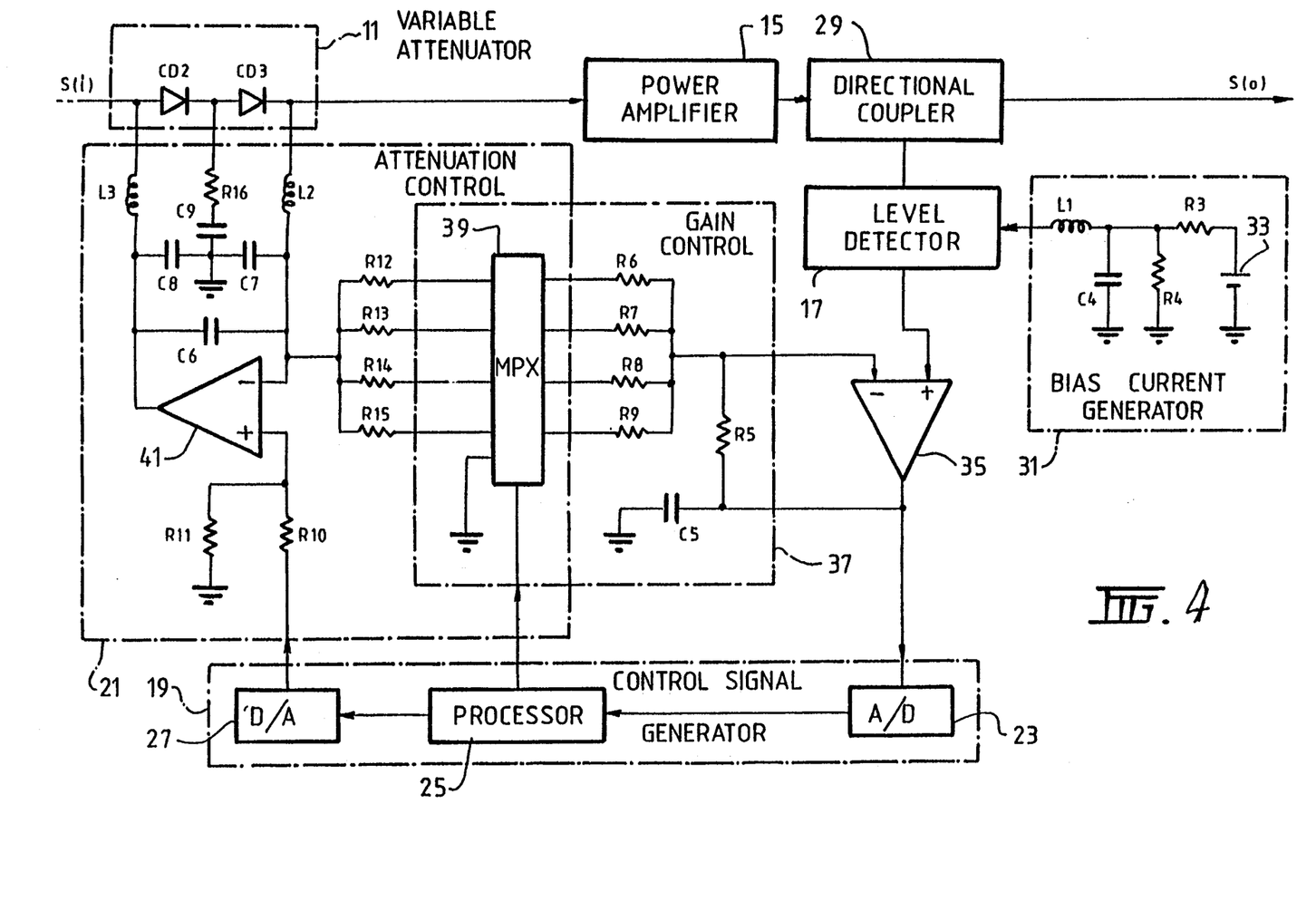
FIG. 4 is a block diagram of a level control device according to an embodiment of the instant invention.

Referring now to FIG. 4, the description will proceed to a level control device according to a preferred embodiment of this invention. Similar parts are designated by like reference numerals and symbols and are operable with likewise named signals which have similarly named levels or values indicated by like reference symbols. It is presumed as described before that the device input signal S(i) is an IF signal. The up converter 13 is not depicted merely for simplicity of illustration.

The level detector 17 has a similar structure and is not depicted in detail. The level detector 17 is, however, accompanied by a bias current generator 31 connected to a point of connection between the first capacitor C1 and the detector diode CD1 which are illustrated in FIG. 1. The level detector 17 is controlled by a bias current supplied thereto from the bias current generator 31.

The bias current generator 31 comprises a power source 33 depicted as a battery. The power source 33 has a source voltage which is typically 5 volts. Diodes, resistors, and capacitors will be numbered hereinafter serially continuing those used in the level detector 17.

A third resistor R3 and a first coil L1 are connected in series between the power source 33 and the point of connection of the first capacitor and the detector diode. A fourth capacitor C4 and a fourth resistor R4 are connected in parallel between ground and a point of connection between the third resistor and the first coil.

The bias current develops a bias voltage at the point of connection between the second resistor R2 (FIG. 1) and the point of connection of the first resistor R1 and the third capacitor C3, both depicted in FIG. 1. The bias current has a bias current value determined by circuit constants of the level detector 17 and the bias current generator 31, the source voltage of the power source 33 inclusive.

The bias voltage does not appreciably depend on the controlled output level as depicted in FIG. 2 by a dashed line labelled V(b) but varies with the temperature in compliance with temperature dependencies of the circuit constants like the detected voltage.

Figures 5, 6:
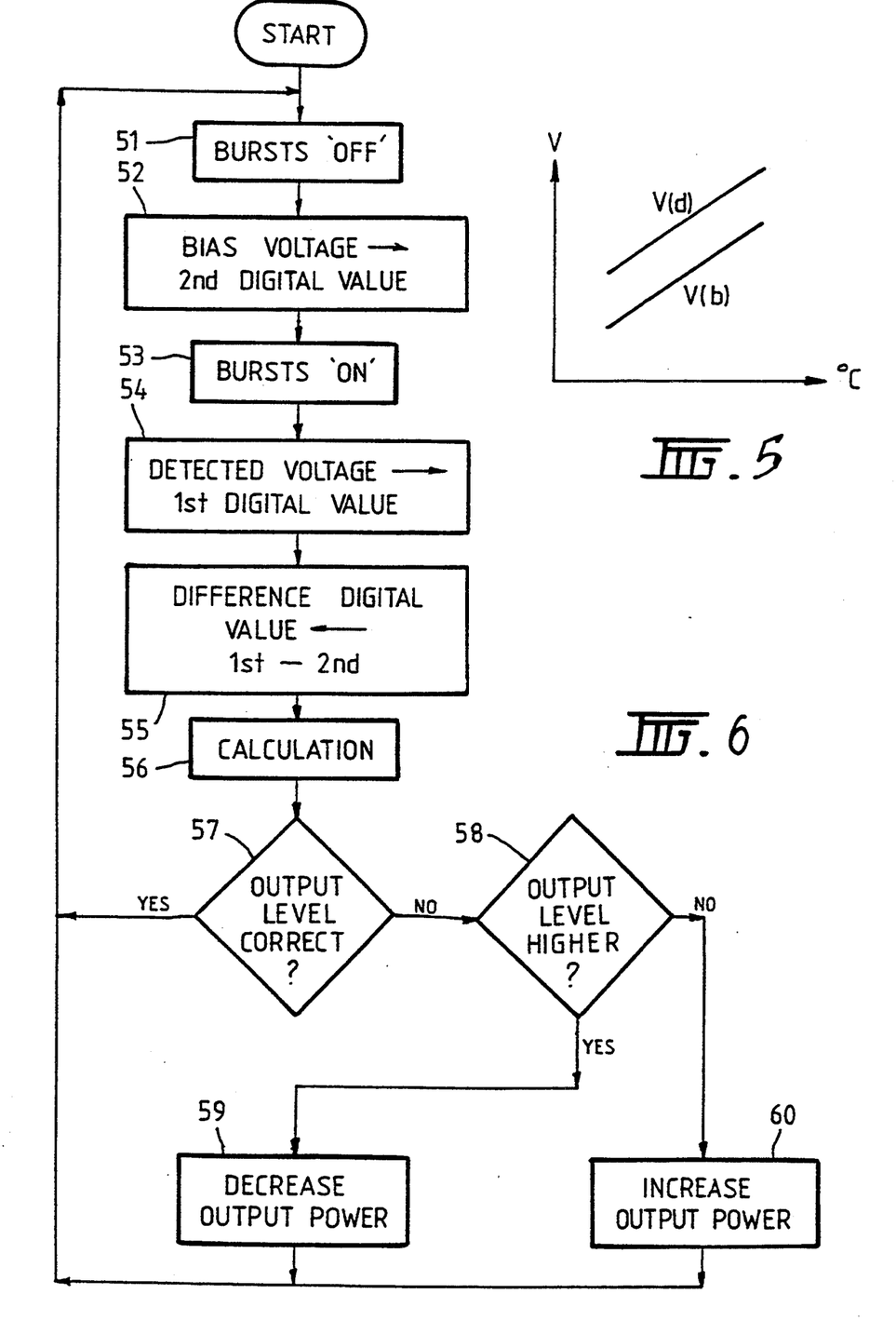
FIG. 5 schematically shows a relationship between a detected voltage and a bias voltage used in the level control device depicted in FIG. 4.
FIG. 6 is a flow chart for use in describing operation of the level control device illustrated in FIG. 4.

Turning temporarily to FIG. 5 with FIG. 4 continuously referred to, temperature is depicted along the abscissa in °C. Voltage is illustrated along the ordinate in V. It will be assumed that the detected voltage varies in the manner exemplified by a straight line labelled V(d).

In accordance with this invention, the bias current is selected so that the bias voltage may vary as exemplified in FIG. 5 by another straight line labelled V(b). More particularly, the circuit constants are selected so that the bias voltage is given a substantially constant difference from the detected voltage irrespective of the temperature variation.

Turning back to FIG. 4, attention should be directed to the fact that the level control device is used in the TDM modulation system. Each of the device input and output signals is therefore a succession of bursts. The level detector 17 produces the detected signal with the detected voltage related to the attenuation level, namely, to the controlled output level, when the bursts are on. The detected signal is given the bias voltage alone when the bursts are off.

It will be surmised during a short while that the detected signal is supplied directly to the control signal generator 19. The input level varies between the detected voltage and the bias voltage.

In the control signal generator 19, the A/D converter 23 converts the detected voltage and the bias voltage to a first digital value and a second digital value. The processor 25 subtracts the second digital value from the first digital value to derive a difference digital value, which is substantially independent of the temperature variation. Subsequently, the processor 25 compares the difference digital value with the reference value to derive a digital control value as the processed level described before and to produce a processor output signal having a digital processor output value proportional to the digital control value. The D/A converter 27 converts the digital control value to an analog value to produce the attenuation control signal with the analog value used as the attenuation control level.

As a result, the attenuation control level is substantially independent of the temperature variation. Furthermore, the substantially temperature independent digital value is useful in removing a slight error which may be introduced into the controlled output level when the bias voltage has not a completely constant difference from the detected voltage. It is now possible to obviate the temperature error which would otherwise be introduced into the controlled output level or power. This is correct under the condition that the bias voltage is given a substantially constant difference from the detected voltage irrespective of the temperature variation. However, even if the difference between the bias voltage and the detected voltage varies in dependence on the temperature variation, the present invention can reduce the temperature error in the controlled output level in comparison with the above-mentioned novel level control device where only the detected voltage is compared with the reference voltage to control the attenuator. This is because, according to this invention, the difference digital value is made which is a difference between the bias voltage and the detected voltage, and is compared with the reference digital value to produce the digital control value. The processor output signal has the digital processor output value proportional to the digital control value. The processor output signal is D/A converted into the attenuation control signal which controls the variable attenuator 11.

In FIG. 4, it is preferred that the detected signal is not supplied directly to the control signal generator 19 but through a single operational amplifier which has a noninverted and an inverted input terminal and an amplifier output terminal and serves as a variable gain amplifier 35 having a variable gain. Supplied with the detected signal at the noninverted input terminal, the variable gain amplifier 35 produces an amplifier output signal from the amplifier output terminal for supply to the control signal generator 19.

Although dependent on the variable gain, the amplifier output signal has an amplified voltage which is related to the detected voltage or the controlled output level and is related to the bias voltage. Inasmuch as the bias voltage is given the substantially constant difference from the detected voltage in the amplifier output signal, the control signal generator 19 is operable in the manner described in the foregoing. It should, however, be noted that the control signal generator 19 additionally produces the processor output signal from the processor 25.

A gain controller 37 comprises an analog multiplexer (MPX) 39 grounded and a fifth resistor R5 connected to the inverted input terminal and to the amplifier output terminal of the variable gain amplifier 35. The amplifier output terminal is grounded through a fifth capacitor C5. In the example being illustrated, sixth through ninth resistors R6, R7, R8, and R9, four in number, are connected in parallel between the inverted input terminal and the multiplexer 39. Controlled by the processor output signal, the multiplexer 39 grounds the inverted input terminal through a selected resistor of the four resistors R6 to R9 therethrough. Inasmuch as the selected resistor is selected from the four registers R6 to R9, it is possible to use two binary bits as the processor output signal.

Controlled by the gain controller 37, the variable gain amplifier 35 amplifies the detected signal with a greater gain when the controlled output level is lower. This decreases the converter error relative to the values processed in the control signal generator 19.

In FIG. 4, the variable attenuator 11 comprises first and second attenuator diodes as second and third diodes CD2 and CD3. The second and the third diodes are typically PIN diodes connected in series to have a point of series connection therebetween. A combination of the second and the third diodes has an input end of the variable attenuator 11 supplied with the device input signal and an output end of the variable attenuator 11 at which the attenuator output signal is produced.

Being used as the attenuation control signal supply arrangement 21, an attenuation control unit will be designated by the reference numeral 21 and shares the multiplexer 39 with the gain controller 37. In the attenuation control unit 21, a tenth resistor R10 is supplied with the attenuation control signal at its one end. The other end is grounded through an eleventh resistor R11.

A component operational amplifier 41 has a noninverted and an inverted input terminal and an amplifier output terminal. A point of connection between the tenth and the eleventh resistors is connected to the noninverted input terminal. A parallel connection of twelfth through fifteenth resistors R12, R13, R14, and R15, four in number, is connected between the inverted input terminal and the multiplexer 39. Controlled by the processor output signal, the multiplexer 39 grounds a selected resistor of the four resistors R12 through R15 therethrough. The component operational amplifier 41 and the selected resistor of the four resistors are used as a constant current circuit for compensating for the temperature error of the attenuator diodes CD2 and CD3. In addition, each of the four resistors R12 through R15 improves the nonlinearity of the attenuation characteristic.

A sixth capacitor C6 is connected between the inverted input terminal and the amplifier output terminal of the component operational amplifier 41. A second coil L2 is connected to the inverted input terminal and to the output end of the variable attenuator 11. A seventh capacitor C7 is connected between ground and a point of connection of the second coil to the inverted input terminal.

A third coil L3 is connected to the amplifier output terminal of the component operational amplifier 41 and to the input end of the variable attenuator 11. An eighth capacitor C8 is connected between ground and a point of connection of the third coil to the amplifier output terminal. A sixteenth resistor R16 is connected to the point of series connection of attenenuator diodes CD2 and CD3. A ninth capacitor C9 grounds the sixteenth resistor.

Reviewing FIG. 4, it is now understood that the variable gain amplifier 35 and the gain controller 37 are cooperative to serve as an amplifying arrangement for amplifying the detected signal with a higher gain corresponding to a lower level of the controlled output power or level. The attenuation control unit 21 serves as an attenuating arrangement for attenuating the attenuation control level with a greater amount of attenuation which corresponds to the lower level of the controlled output level, namely, to the higher gain.

Referring to FIG. 6 in addition to FIG. 4, it will be surmised that the processor 25 controls operation of the control signal generator 19. Merely for brevity of the description, it will be assumed that the detected signal is supplied directly from the level detector 17 to the control signal generator 19.

At a first step 51, the processor 25 knows that the bursts are off. At a second step 52, the A/D converter 23 converts the bias voltage to the second digital value. At a third step 53, the processor 25 knows that the bursts are on. At a fourth step 54, the A/D converter 23 converts the detected voltage to the first digital value.

At a fifth step 55, the processor 25 subtracts the second digital value from the first digital value to derive the difference digital value. At a sixth step 56, the processor 25 calculates control values which may be used to control the level control device.

At a seventh step 57, the processor 25 checks whether or not the difference digital value is correct. This check is for checking whether or not the controlled output power or level is correct. If the controlled output level is correct, the seventh step 57 is returned to the first step 51.

If the controlled output level is incorrect at the seventh step 57, the processor 25 checks at an eighth step 58 whether or not the controlled output level is high. If the controlled output level is high, the processor 25 increases at a ninth step 59 the attenuation control level to decrease the controlled output level. If the controlled output level is low, the processor 25 increases at a tenth step 60 the controlled output level. The ninth step 59 or the tenth step 60 is returned to the first step 51.

Reviewing FIGS. 4 through 6, the level control device is excellently operable. Merely by way of example, let it be assumed that the level control device is used in a mobile communication system of a cellular type. When a down-going signal is received with a minimum level which is not higher than minus 4 dBm, a conventional level control device had a detection error of plus or minus 6 dB. The conversion errors of plus or minus 5 dB and 10 dB were introduced into the controlled output power by an A/D converter and a D/A converter.

When use is made of the level control device being illustrated, the detection error was reduced between plus and minus 0.4 dB. The conversion errors of the A/D converter 23 and the D/A converter 27 were decreased between plus and minus 0.5 dB and 0.4 dB. Even in a worst case, the controlled output power or level had an output error between only plus and minus 1.3 dB. Four parallel resistors R6 to R9 or R12 to R15 are usually sufficient.

While this invention has thus far been described in specific conjunction with a single embodiment thereof, it will now be readily possible for one skilled in the art to put this invention into practice in various other manners. For example, a variable gain amplifier is an equivalent of the variable attenuator 11. It is possible to modify the level detector 17.

What is claimed is:

1. A level control device producing for use in time division multiplex modulation a device output signal in response to a device input signal with said device output signal given at a controlled output level and comprising:

a variable attenuator responsive to said device input signal for producing an attenuator output signal having an attenuated level, a bias current generator for generating a bias current, level detecting means controlled by said bias current generator for detecting said attenuator output signal to:

produce a detected signal, develop a bias voltage, and give said detected signal alternatingly a detected voltage related to said attenuated level and said bias voltage, a control signal generator, responsive to a generator input signal and a reference value, for generating an attenuation control signal having an attenuation control level, attenuation control signal supply means for supplying said attenuation control signal to said variable attenuator to enable use of said attenuator output signal as said device output signal, a gain variable amplifier for amplifying said detected signal with a variable gain into an amplifier output signal to give said amplifier output signal alternatingly an amplified voltage related to said detected voltage and an amplified voltage related to said developed bias voltage, a gain controller responsive to a device control signal from said control signal generator for controlling said variable gain, said bias current generator generating said bias current to give said bias voltage a substantially constant difference from said detected voltage irrespective of a temperature variation; and said control signal generator using said amplifier output signal as said generator input signal to convert said detected voltage and said bias voltage collectively to a substantially temperature independent digital value and comparing said digital value with said reference value to derive an analog value for use as said attenuation control level.

2. The level control device as claimed in claim 1, wherein said device input signal comprises an intermediate frequency signal, and said level detecting means comprises:

an up converter for converting said attenuator output signal to a radio frequency signal, a power amplifier for amplifying said radio frequency signal into an amplified signal having an amplified level related to said attenuated level, and a level detector supplied with said amplified signal and controlled by said bias current generator to produce said detected signal with said detected voltage related to said amplified level, wherein said amplified signal is used as said device output signal.

3. The level control device as claimed in claim 1, wherein said device input signal comprises a radio frequency signal, and said level detecting means comprises:

a power amplifier for amplifying said attenuator output signal into an amplified signal having an amplified level related to said attenuated level, and a level detector supplied with said amplified signal and controlled by said bias current generator to produce said detected signal with said detected voltage related to said amplified level, wherein said amplified signal is used as said device output signal.

4. The level control device as claimed in claim 1, wherein said control signal generator comprises:

an A/D converter for converting said amplified voltage related to said detected voltage and said amplified bias voltage to first and second digital values, a processor for subtracting said second digital value from said first digital value to derive a difference digital value and for comparing said difference digital value with said reference value to produce a processor output signal to said gain controller as said device control signal having a digital processor output value proportional to said difference digital value, and a D/A converter for converting said digital processor output value to said analog value.

5. The level control device as claimed in claim 1, wherein:

said gain variable amplifier amplifies said detected signal with a higher gain when said controlled output level is low; and said variable attenuator attenuates said attenuation control level with a greater amount of attenuation which corresponds to said higher gain.

6. A level control device producing for use in time division multiplex modulation a device output signal in response to a device input signal with said device output signal given at a controlled output level and comprising:

a variable attenuator, responsive to said device input signal, for producing an attenuator output signal having an attenuated level, a bias current generator for generating a bias current, level detecting means controlled by said bias current generator for detecting said attenuator output signal to:

produce a detected signal, develop a developed bias voltage, and give said detected signal alternatingly a detected voltage and said bias voltage, a control signal generator, responsive to a generator input signal and a reference value, for generating an attenuation control signal having an attenuation control level, and attenuation control signal supply means for supplying said attenuation control signal to said variable attenuator to enable use of said attenuator output signal as said device output signal, a gain variable amplifier for amplifying said detected signal with a variable gain into an amplifier output signal to give said amplifier output signal alternatingly an amplified voltage related to said detected voltage and an amplified bias voltage related to said developed bias voltage, gain controller responsive to a device control signal from said control signal generator for controlling said variable gain, said bias current generator generating said bias current to give said developed bias voltage a substantially constant difference from said detected voltage irrespective of a temperature variation;

said control signal generator using said amplifier output signal as said generator input signal to convert said amplified voltage and said amplified bias voltage collectively to a substantially temperature independent digital value and comparing said digital value with said reference value to produce a processor output signal having a digital processor output value proportional to said temperature independent digital value, and to convert said digital processor output value to an analog signal for use as said attenuation control level, said control signal generator supplying said processor output signal to said gain controller as said device control signal.

7. The level control device as claimed in claim 6, wherein said device input signal comprises an intermediate frequency signal, and said level detecting means comprises;

an up converter for converting said attenuator output signal to a radio frequency signal, a power amplifier for amplifying said radio frequency signal into an amplified signal having an amplified level related to said attenuated level, and a level detector supplied with said amplified signal and controlled by said bias current to produce said detected signal with said detected voltage related to said amplified level, wherein said amplified signal is used as said device output signal.

8. The level control device as claimed in claim 6, wherein said device input signal comprises a radio frequency signal, and said level detecting means comprises:
- a power amplifier for amplifying said attenuator output signal into an amplified signal having an amplified level related to said attenuated level, and
- a level detector supplied with said amplified signal and controlled by said bias current generator to produce said detected signal with said detected voltage related to said amplified level, wherein said amplified signal is used as said device output signal.

9. The level control device as claimed in claim 6, wherein said control signal generator comprises:
- an A/D converter for converting said amplified voltage related to said detected voltage and said amplified bias voltage to first and second digital values,
- a processor for subtracting said second digital value from said first digital value to derive a difference digital value as said substantially temperature independent digital value and for comparing said difference digital value with said reference value to derive said digital processor output value and to produce said processor output signal to said gain controller as said device control signal, and
- a D/A converter for converting said digital processor output value to said analog value.

10. The level control device as claimed in claim 6, wherein said attenuation control signal supply means comprises an attenuation control unit, supplied with said attenuation control signal and controlled by said processor output signal, for controlling said attenuation control level.

* * * * *